US008088306B2

(12) United States Patent
Kim et al.

(10) Patent No.: US 8,088,306 B2
(45) Date of Patent: Jan. 3, 2012

(54) ELECTROCONDUCTIVE THERMOPLASTIC RESIN COMPOSITION AND PLASTIC ARTICLE INCLUDING THE SAME

(75) Inventors: Tae Kyun Kim, Uiwang-si (KR); Young Sil Lee, Uiwang-si (KR); Young Kyu Chang, Uiwang-si (KR)

(73) Assignee: Cheil Industries Inc., Gumi-si (KR)

(*) Notice: Subject to any disclaimer, the term of this patent is extended or adjusted under 35 U.S.C. 154(b) by 256 days.

(21) Appl. No.: 12/488,771

(22) Filed: Jun. 22, 2009

(65) Prior Publication Data

US 2009/0321687 A1 Dec. 31, 2009

Related U.S. Application Data

(63) Continuation-in-part of application No. PCT/KR2006/005856, filed on Dec. 28, 2006.

(30) Foreign Application Priority Data

Dec. 22, 2006 (KR) .................. 10-2006-0132286

(51) Int. Cl.
*H01B 1/24* (2006.01)
*H01B 1/22* (2006.01)

(52) U.S. Cl. ........ 252/511; 252/507; 252/508; 252/509; 252/506

(58) Field of Classification Search .................. 252/511, 252/507, 508, 509, 506
See application file for complete search history.

(56) References Cited

U.S. PATENT DOCUMENTS

| 6,528,572 | B1 * | 3/2003 | Patel et al. ............... 524/495 |
| 6,734,262 | B2 * | 5/2004 | Patel ........................ 525/419 |
| 6,942,823 | B2 * | 9/2005 | Terada et al. ............. 252/511 |
| 7,060,241 | B2   | 6/2006 | Glatkowski |
| 7,238,415 | B2 * | 7/2007 | Rodriguez et al. ......... 428/297.4 |
| 7,413,684 | B2 * | 8/2008 | Fishburn et al. ........... 252/500 |
| 7,462,656 | B2 * | 12/2008 | Keulen et al. ............. 523/351 |
| 7,696,274 | B2 * | 4/2010 | Terada et al. ............. 524/495 |
| 2003/0092824 | A1 * | 5/2003 | Bastiaens et al. ......... 524/495 |
| 2003/0116757 | A1 * | 6/2003 | Miyoshi et al. ............ 252/511 |
| 2004/0144963 | A1   | 7/2004 | Braig et al. |

FOREIGN PATENT DOCUMENTS

| CN | 1864233 A | 11/2006 |
| JP | 2004-168966 A | 6/2004 |
| KR | 10-2006-0052657 A | 5/2006 |
| WO | 2008/078849 A1 | 7/2008 |

OTHER PUBLICATIONS

International Search Report in counterpart International Application No. PCT/KR2006/005856, mailed Sep. 20, 2007.
Chinese Office Action in counterpart Chinese Application No. 200680056762.7 dated Mar. 24, 2011, pp. 1-5.
English translation of Chinese Office Action in counterpart Chinese Application No. 200680056762.7 dated Mar. 24, 2011, pp. 1-6.

* cited by examiner

*Primary Examiner* — Douglas McGinty
(74) *Attorney, Agent, or Firm* — Summa, Additon & Ashe, P.A.

(57) ABSTRACT

Disclosed herein are an electrically conductive thermoplastic resin composition and a plastic article including the same. The electrically conductive thermoplastic resin composition comprises about 80 to about 99.9 parts by weight of a thermoplastic resin, about 0.1 to about 10 parts by weight of carbon nanotubes, about 0.1 to about 10 parts by weight of an impact modifier, based on a total of about 100 parts by weight of the thermoplastic resin and the carbon nanotubes, and about 0.1 to about 10 parts by weight of conductive metal oxide, based on a total of about 100 parts by weight of the thermoplastic resin and the carbon nanotubes.

14 Claims, No Drawings

ELECTROCONDUCTIVE THERMOPLASTIC RESIN COMPOSITION AND PLASTIC ARTICLE INCLUDING THE SAME

CROSS-REFERENCE TO RELATED APPLICATIONS

This non-provisional application is a continuation-in-part application of PCT Application No. PCT/KR2006/005856, filed Dec. 28, 2006, pending, which designates the U.S. and which is hereby incorporated by reference in its entirety, and claims priority therefrom under 35 USC Section 120. This application also claims priority under 35 USC Section 119 from Korean Patent Application No. 10-2006-0132286, filed Dec. 22, 2006, the entire disclosure of which is also hereby incorporated by reference.

FIELD OF THE INVENTION

The present invention relates to an electrically conductive thermoplastic resin composition and a plastic article including the same.

BACKGROUND OF THE INVENTION

Thermoplastic resins are plastics that are softened and plasticized by heating and are hardened by cooling. Thermoplastic resins are divided into: common plastics such as polyethylene, polypropylene, acrylic resin, styrenic resin, and vinyl resins; and engineering plastics such as polycarbonate, polyphenylene ether, polyamide, polyester, and polyimide resins.

Thermoplastic resins are widely used in numerous applications, including various household supplies, office automation equipment, and electric and electrical appliances owing to their superior processability and formability. There has been a continuous attempt to use a thermoplastic resin as a high value-added material by imparting specific properties as well as superior processability and formability to the thermoplastic resin, according to the kind and properties of products in which the thermoplastic resin is used. In particular, there have been various attempts to impart electrical conductivity to a thermoplastic resin and utilize the electrically conductive thermoplastic resin in the manufacture of automobiles, electric apparatuses, electronic assemblies, and electrical cables with electromagnetic wave shielding performance.

Electrically conductive thermoplastic resin is conventionally prepared from an electrically conductive thermoplastic resin composition obtained by mixing a thermoplastic resin with a conductive additive, such as carbon black, a carbon fiber, a metallic powder, a metal-coated inorganic powder, or a metallic fiber. To ensure a desired level of electrical conductivity of the electrically conductive thermoplastic resin, the conductive additive needs to be used in a significantly large amount. However, the use of the conductive additive in significantly large amounts can deteriorate impact resistance, which is one of the basic mechanical properties of the thermoplastic resin.

In addition, there have also been efforts to impart superior electrical conductivity to a thermoplastic resin using carbon nanotubes as a conductive additive.

However, when an electrically conductive thermoplastic resin is prepared by mixing a thermoplastic resin with carbon nanotubes and injecting the mixture using injection molding equipment, the carbon nanotubes show mobility and unexpected orientation due to shearing stress occurring during the injection. As a result, disconnection between the carbon nanotubes in the electrically conductive thermoplastic resin occurs, thus causing deterioration in electrical conductivity. Accordingly, where carbon nanotubes are used, the carbon nanotubes need to be added in a significantly large amount to the thermoplastic resin in order to ensure the desired electrical conductivity. The use of such large amounts of the carbon nanotubes, however, can deteriorate impact resistance, which is one of the basic mechanical properties of the electrically conductive thermoplastic resin.

SUMMARY OF THE INVENTION

The present invention relates to an electrically conductive thermoplastic resin composition with improved electrical conductivity and superior physical properties (e.g., impact resistance) and a plastic article including the same.

In accordance with one aspect of the present invention, there is provided an electrically conductive thermoplastic resin composition comprising: about 80 to about 99.9 parts by weight of a thermoplastic resin; about 0.1 to about 10 parts by weight of carbon nanotubes; about 0.1 to about 10 parts by weight of an impact modifier, based on a total of about 100 parts by weight of the thermoplastic resin and the carbon nanotubes; and about 0.1 to about 10 parts by weight of conductive metal oxide, based on a total of about 100 parts by weight of the thermoplastic resin and the carbon nanotubes.

Details of other aspects and exemplary embodiments of the present invention are encompassed in the following detailed description.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to one embodiment of the present invention, there may be provided an electrically conductive thermoplastic resin composition comprising: about 80 to about 99.9 parts by weight of a thermoplastic resin; about 0.1 to about 10 parts by weight of carbon nanotubes; about 0.1 to about 10 parts by weight of an impact modifier, based on a total of about 100 parts by weight of the thermoplastic resin and the carbon nanotubes; and about 0.1 to about 10 parts by weight of conductive metal oxide, based on a total of about 100 parts by weight of the thermoplastic resin and the carbon nanotubes.

As described above, the electrically conductive thermoplastic resin composition comprises carbon nanotubes and conductive metal oxide. During injection or extrusion molding of the electrically conductive thermoplastic resin composition, the conductive metal oxide prevents the carbon nanotubes from being unexpectedly oriented or mobilized, thus avoiding the disconnection between carbon nanotubes. Thus, it is possible to obtain an electrically conductive thermoplastic resin with more improved electrical conductivity by employing the resin composition.

In addition, the impact modifier in the resin composition can prevent deterioration of basic mechanical properties (e.g., impact resistance) of the electrically conductive thermoplastic resin, which results from the addition of the carbon nanotubes and conductive metal oxide. Hence, the electrically conductive thermoplastic resin composition can have superior impact resistance as well as more improved electrical conductivity.

Each constituent component of the electrically conductive thermoplastic resin composition will be described in detail.

The electrically conductive thermoplastic resin composition comprises about 80 to about 99.9 parts by weight of the thermoplastic resin.

Any thermoplastic resin including any common and engineering plastics may be used without any particular limitation so long as the resin can be used in extrusion or injection molding.

Examples of the thermoplastic resin include without limitation polyacetal, acrylic resin, polycarbonate, styrenic resin, polyester, vinyl resin, polyphenylene ether, polyolefin, acrylonitrile-butadiene-styrene copolymer, polyarylate, polyamide, polyamide imide, polyarylsulfone, polyether imide, polyethersulfone, polyphenylene sulfide, polyvinylidene fluoride resin, polyimide, polyetherketone, polybenzoxazole, polyoxadiazole, polybenzothiazole, polybenzimidazole, polypyridine, polytriazole, polypyrrolidine, polydibenzofuran, polysulfone, polyurea, polyphosphazene and liquid crystal polymer resins. In addition, the thermoplastic resin may be used as a copolymer or combination thereof.

Depending on the physical properties of the thermoplastic resin or the type of product with which it is used, the thermoplastic resin can include, but is not limited to: polyolefin resins such as polyethylene, polypropylene, ethylene-vinyl acetate copolymer, and ethylene-methyl methacrylate copolymer resins; styrenic resins; and engineering plastics such as polyamide, polyester (e.g., polyethylene terephthalate or polybutylene terephthalate), polycarbonate resins; and copolymers and combinations thereof.

Hereinafter, exemplary polycarbonate, polyester and polyolefin resins suitable as the thermoplastic resin will be described in detail.

First, polyolefin resin may be used as the thermoplastic resin.

The polyolefin resin can be prepared by radical polymerization or metal-catalyzed polymerization of an olefin monomer, such as polyolefin resins prepared using Ziegler-Natta, metallocene or Phillips catalysts. There is no limitation as to the preparation method of the polyolefin resin. Accordingly, any polyolefin resin prepared using any method well-known to those skilled in the art may be used in the present invention.

Second, polyester resin may be used as the thermoplastic resin.

The polyester resin may contain an ester linkage in a polymer chain and be melted by heating. The polyester resin may be prepared by polycondensation of dicarboxylic acid and a dihydroxy compound. There is no limitation as to the preparation method of the polyester resin. Accordingly, any polyester resin prepared using any method well-known to those skilled in the art may be used in the present invention. In addition, any polyester resin, such as a homopolyester or copolyester resin, as well as combinations thereof, may be used without any particular limitation.

Third, polycarbonate resin may be used as the thermoplastic resin.

Examples of the polycarbonate resin may include without limitation aromatic polycarbonate resins, which can be prepared by reacting phosgene, halogen formate, or diester carbonate with a diphenol compound represented by Formula 1 below:

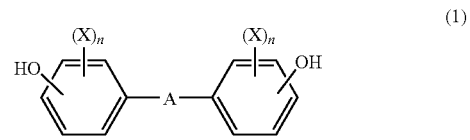

wherein A is a single bond, $C_1$-$C_5$ alkylene, $C_1$-$C_5$ alkylidene, $C_5$-$C_6$ cycloalkylidene, —S— or —$SO_2$—; X is halogen; and n is 0, 1 or 2.

Examples of the diphenol compounds of Formula 1 include without limitation hydroquinone, resorcinol, 4,4'-dihydroxydiphenyl, 2,2-bis-(4-hydroxyphenyl)-propane (also referred to as "bisphenol-A" or "BPA"), 2,4-bis-(4-hydroxyphenyl)-2-methylbutane, 1,1-bis-(4-hydroxyphenyl)-cyclohexane, 2,2-bis-(3-chrolo-4-hydroxyphenyl)-propane and 2,2-bis-(3,5-dichrolo-4-hydroxyphenyl)-propane.

The polycarbonate resin may have a weight average molecular weight of about 15,000 to about 50,000 g/mol.

There is no limitation as to the type of the polycarbonate resin. For example, the polycarbonate resin may be a linear or branched polycarbonate resin, or a polyester-carbonate copolymer resin, or a combination thereof. The branched polycarbonate resins may be prepared by using about 0.05 to about 2 mol % of a tri- or higher functional (i.e., polyfunctional) compound, such as a tri- or higher functional phenol compound, based on the total moles of the diphenol compound of Formula 1. The polyester-carbonate copolymer resins may be prepared by polymerizing polycarbonate in the presence of an ester precursor, such as dicarboxylic acid.

The polycarbonate resin may be a homopolycarbonate, a copolycarbonate resin, or a combination thereof.

As mentioned above, suitable examples of the thermoplastic resin include, but are not limited to polycarbonate, polyester and polyolefin resins, and combinations thereof. The composition and preparation method of each thermoplastic resin are well-known to those skilled in the art.

The electrically conductive thermoplastic resin composition may further comprise carbon nanotubes. The inclusion of the carbon nanotubes enables the thermoplastic resin to exhibit superior electrical conductivity.

The carbon nanotubes have superior mechanical strength, high initial Young's modulus and a large aspect ratio. In addition, the carbon nanotubes have superior electrical conductivity and thermal stability. Accordingly, adding the carbon nanotubes to the thermoplastic resin can impart superior electrical conductivity to the thermoplastic resin.

Carbon nanotubes can be synthesized by arc-discharge, pyrolysis, laser ablation, plasma enhanced chemical vapor deposition (PECVD), thermal chemical vapor deposition, electrolysis or flame synthesis. However, there is no limitation as to the synthesis method of the carbon nanotubes. Accordingly, carbon nanotubes synthesized by employing any method may be used for the electrically conductive thermoplastic resin composition without any particular limitation.

Carbon nanotubes are divided into single-walled carbon nanotubes, double-walled carbon nanotubes and multi-walled carbon nanotubes, based on the wall number thereof. These carbon nanotubes may be used for the electrically conductive thermoplastic resin composition without any particular limitation.

Carbon nanotubes useful in the present invention may have a diameter (thickness) of about 1 to about 50 nm, for example about 2 to about 10 nm, and a length of about 0.01 to about 10 μm, for example about 1 to about 10 μm. Based on the diameter and length, the carbon nanotubes may have an aspect ratio (L/D) of about 100 or more, for example about 100 to about 1,000. As a result, the carbon nanotubes can be uniformly distributed in the thermoplastic resin, to thereby provide the electrically conductive thermoplastic resin with superior electrical conductivity.

The electrically conductive thermoplastic resin composition can include the carbon nanotubes in an amount of about 0.1 to about 10 parts by weight, for example about 1 to about 5 parts by weight. An amount of carbon nanotubes less than about 0.1 parts by weight can make it difficult to adjust the electrical conductivity of the prepared electrically conductive thermoplastic resin to the desired level. An amount of carbon nanotubes exceeding about 10 parts by weight can cause deterioration in mechanical and physical properties of the electrically conductive thermoplastic resin.

The electrically conductive thermoplastic resin composition may further comprise an impact modifier. The impact modifier may be a rubber impact modifier such as a core-shell graft copolymer, a silicone polymer, an olefin polymer, or a combination thereof.

When the electrically conductive thermoplastic resin composition includes an impact modifier, rubbery particles can be distributed therein, which can improve the physical properties (e.g., impact resistance) thereof. That is to say, the impact modifier can offset deterioration in physical properties of the electrically conductive thermoplastic resin due to the carbon nanotubes or the conductive metal oxide, which are used to impart electrical conductivity to the electrically conductive thermoplastic resin, thereby obtaining the electrically conductive thermoplastic resin with improved physical properties.

The core-shell graft copolymer can be prepared by polymerizing a rubber monomer and grafting an unsaturated compound on a rubber core of the resulting polymer. The core-shell graft copolymer has a core-shell structure in which the unsaturated compound is grafted on the rubber core in the form of a hard shell.

For example, the core-shell graft copolymer can have a core-shell structure in which an unsaturated compound, such as methyl methacrylate, styrene, and/or acrylonitrile, is grafted on a rubber polymer core polymerized from at least one monomer such as $C_4$-$C_6$ diene, acrylic, and/or silicone rubber monomers.

The core-shell graft copolymer can comprise about 20 to about 90% by weight of the rubber core and about 10 to about 80% by weight of the shell grafted on the rubber core. As a result, the mechanical properties (e.g., impact resistance) of the electrically conductive thermoplastic resin can be efficiently offset.

Examples of the diene rubber monomers that may be used to prepare the core-shell graft copolymer include without limitation butadiene, ethylene-propylene, styrene-butadiene, acrylonitrile-butadiene, isoprene, ethylene-propylene-diene copolymer (EPDM) rubbers, and the like and combinations thereof.

Examples of the acrylic rubber monomers include without limitation methyl acrylate, ethyl acrylate, n-propyl acrylate, n-butyl acrylate, 2-ethylhexyl acrylate, hexyl methacrylate, 2-ethylhexyl methacrylate, and the like, and combinations thereof. Ethylene glycol dimethacrylate, propylene glycol dimethacrylate, 1,3-butylene glycol dimethacrylate, 1,4-butylene glycol dimethacrylate, allyl methacrylate, triallyl cyanurate, and the like, and combinations thereof may be used as a hardener (cross-linking agent) to polymerize the rubber monomer.

Examples of the silicone rubber monomer include without limitation hexamethyl cyclotrisiloxane, octamethyl cyclotetrasiloxane, decamethyl cyclopentasiloxane, dodecamethyl cyclohexasiloxane, trimethyl triphenyl cyclotrisiloxane, tetramethyl tetraphenyl cyclotetrasiloxane, octaphenyl cyclotetrasiloxane, and the like, and combinations thereof. Trimethoxy methylsilane, triethoxy phenylsilane, tetramethoxysilane, tetraethoxysilane, and the like, and combinations thereof may be used as a hardener (cross-linking agent) to polymerize the silicone rubber monomer.

Examples of the rubber monomer that may be used to prepare the core-shell graft copolymer include, but are not limited to, diene, acrylic and silicone rubber monomers, and combinations thereof. In addition, any diene, acrylic and silicone rubber monomer may be used without any particular limitation.

As described above, a silicone polymer or an olefin polymer may also used as the impact modifier.

The silicone polymer may include a polymer of at least one silicone rubber monomer selected from hexamethyl cyclotrisiloxane, octamethyl cyclotetrasiloxane, decamethyl cyclopentasiloxane, dodecamethyl cyclohexasiloxane, trimethyl triphenyl cyclotrisiloxane, tetramethyl tetraphenyl cyclotetrasiloxane, octaphenyl cyclotetrasiloxane, and the like, and combinations thereof. Trimethoxy methylsilane, triethoxyphenylsilane, tetramethoxysilane, tetraethoxysilane, and the like, and combinations thereof can be used as a hardener (cross-linking agent) to polymerize the silicone rubber monomer.

The olefin polymer may include a polymer of at least one monomer selected from ethylene, propylene, isopropylene, butylene, isobutylene, and the like and combinations thereof. The olefin polymer may be prepared by using various olefin polymerization catalysts, e.g., a Ziegler-Natta catalyst. Alternatively, to prepare an olefin polymer having a selective structure, metallocene catalysts may be used. To improve dispersion of the polymer with the thermoplastic resin, a functional group, e.g., maleic anhydride, may be grafted on the olefin polymer.

Suitable examples of the silicone and olefin polymers as the impact modifier have been mentioned. Any silicone or olefin polymer may be used without any particular limitation so long as it is well-known to those skilled in the art as a modifier capable of improving mechanical properties (e.g., impact resistance) of a thermoplastic resin.

The impact modifier can be used in an amount of about 0.1 to about 10 parts by weight, based on a total of about 100 parts by weight of the thermoplastic resin and the carbon nanotubes. The inclusion of the impact modifier in this amount can significantly improve physical properties such as impact resistance, tensile strength, flexural strength and flexural modulus of the electrically conductive thermoplastic resin, and can prevent mobility and orientation of the carbon nanotubes, thereby imparting high electrical conductivity to the electrically conductive thermoplastic resin.

The electrically conductive thermoplastic resin composition further comprises conductive metal oxide. The conductive metal oxide can prevent the carbon nanotubes from being oriented or mobilized during injection of the electrically conductive thermoplastic resin composition, thus avoiding disconnection between the carbon nanotubes. Thus, it is possible to obtain the electrically conductive thermoplastic resin with more improved electrical conductivity.

The conductive metal oxide may be any metal oxide with conductivity. Examples of the conductive metal oxide include without limitation titanium oxide, zinc oxide, indium oxide, tin oxide, indium tin oxide, antimony oxide, zirconium oxide, aluminum oxide, magnesium oxide, barium oxide, calcium oxide, strontium oxide, chromium oxide, iron oxide, and the like, and combinations thereof. In addition, to further improve the conductivity of the conductive metal oxide, the conductive metal oxide may be doped by, coated by, or mixed with a metal such as aluminum, gallium, germanium, indium, tin, and the like, or a combination thereof. Alternatively, other physical or chemical techniques may be used in combination with the metal with metal oxide.

There is no limitation as to the shape of the conductive metal oxide. The conductive metal oxide may be particle, fiber, flat or amorphous shape.

An exemplary metal oxide is conductive zinc oxide. The conductive zinc oxide may be prepared from various zinc oxides. The conductive zinc oxide may be composed of basic constituent particles (so-called primary particles), or aggregate particles (so-called secondary particles) in which the basic constituent particles are fused and bound together.

The conductive zinc oxide can have an average diameter of about 300 nm or less, for example about 200 nm or less.

The conductive zinc oxide can have a structure in which zinc oxide is combined with at least one metal selected from aluminum, gallium, germanium, indium, or tin. The combination can be carried out by doping, coating, mixing or other physical/chemical bonding techniques.

The conductive metal oxide may be used in an amount of about 0.1 to about 10 parts by weight, for example about 0.5 to about 5 parts by weight, based on a total of about 100 parts by weight of the thermoplastic resin and the carbon nanotubes. An amount of the conductive metal oxide less than about 0.1 parts by weight can make it impossible to prevent the carbon nanotubes from being unexpectedly oriented or mobilized. As a result, the carbon nanotubes cannot be efficiently prevented from being disconnected, and thus, the electrically conductive thermoplastic resin may not have sufficient electrical conductivity. Meanwhile, an amount of the conductive metal oxide exceeding about 10 parts by weight can cause deterioration in mechanical properties (e.g., impact resistance) of the electrically conductive thermoplastic resin.

The electrically conductive thermoplastic resin composition may further comprise an additive suitable for the use intended. Examples of additives include without limitation vinyl copolymers, lubricants, release agents, plasticizers, nucleating agents, stabilizers, flame retardants, dyes, pigments, modifiers, inorganic additives, and the like, and combinations thereof. The additive can be added in an amount of about 30 parts by weight or less, based on the total of about 100 parts by weight of the thermoplastic resin and the carbon nanotubes.

The electrically conductive thermoplastic resin can be prepared by conventional methods such as: mixing each constituent component to prepare an electrically conductive thermoplastic resin composition; and melt-extruding the resin composition in an extruder. The electrically conductive thermoplastic resin composition can also be injection molded using methods known in the art. A plastic article is prepared from the electrically conductive thermoplastic resin.

According to another embodiment of the present invention, there is provided a plastic article prepared from the electrically conductive thermoplastic resin composition. For example, the plastic article may comprise a thermoplastic resin matrix, carbon nanotubes dispersed in the thermoplastic resin matrix, an impact modifier dispersed in the thermoplastic resin matrix, and conductive metal oxide dispersed in the thermoplastic resin matrix.

The plastic article exhibits more enhanced electrical conductivity owing to an interaction between the carbon nanotubes and the conductive metal oxide, which prevents orientation and mobility of the carbon nanotubes dispersed in the thermoplastic resin. In addition, the impact modifier dispersed in the thermoplastic resin offsets deterioration in mechanical properties (e.g., impact resistance) of the plastic article due to the inclusion of the carbon nanotubes and conductive metal oxide, thereby ensuring superior mechanical properties of the plastic article.

Accordingly, since the plastic article imparts electrical conductivity to automobiles, electric apparatuses, electronic assemblies and electrical cables, the articles may be widely applicable for a variety of uses, e.g., antistatic or electrostatic discharge.

Now, the present invention will be described in more detail with reference to the following Examples, such that those skilled in the art easily practice the present invention. These examples are provided only for illustrating the present invention and should not be construed as limiting the scope and spirit of the present invention.

The further details for (A) a thermoplastic resin (polycarbonate resin), (B) carbon nanotubes, (C) an impact modifier and (D) conductive metal oxide used in the following examples and comparative examples are as follows:

(A) Thermoplastic Resin (Polycarbonate Resin)

Bisphenol-A polycarbonate (weight average molecular weight (Mw): 25,000 g/mol) is used as a polycarbonate resin selected from thermoplastic resins.

(B) Carbon Nanotubes

Multi-walled carbon nanotubes (C-tube 100® available from CNT Co., LTD., thickness: 10-50 nm, length: 1-25 μm) are used as carbon nanotubes.

(C) Impact Modifier

An ethyl acrylate-butadien-styrene copolymer (C-223A® available from Mitsubishi Chemical Corp., average particle size: 100 nm to 1 μm) is used as an impact modifier.

(D) Conductive Metal Oxide

Conductive zinc oxide (23-K® available from Hakushi Tech) is used as conductive metal oxide.

Examples 1 to 5 and Comparative Examples 1 to 4

The content of each constituent component used in the following examples 1 to 5 and comparative examples 1 to 4 is shown in Tables 1 and 2. Respective components are mixed in accordance with the composition shown in Tables 1 and 2 to prepare an electrically conductive thermoplastic resin composition. The composition is extruded in a double-screw extruder (L/D=36, Φ=45 mm) and the resulting extrudate is pelletized. The pellets are injected in an injection machine (10 oz) at 270° C. to prepare a sample of 10 cm×10 cm for measurement of physical properties and electrical conductivity.

First, the electrical conductivity (surface resistance) of each sample is measured with a surface resistance meter (electrical conductivity evaluation).

The notched IZOD impact strength (1/8") of the sample is measured in accordance with ASTM D256, which is an American standard test method for determining an IZOD impact strength of plastics with a pendulum having a uniform weight (impact resistance evaluation).

The measurement results of the electrical conductivity and impact resistance are shown in Tables 1 and 2 below.

TABLE 1

| | Examples | | | | |
|---|---|---|---|---|---|
| | 1 | 2 | 3 | 4 | 5 |
| (A) thermoplastic resin (wt. parts) | 97 | 97 | 97 | 98 | 99 |
| (B) carbon nanotubes (wt. parts) | 3 | 3 | 3 | 2 | 1 |
| (C) impact modifier (wt. parts) | 1 | 3 | 3 | 3 | 3 |
| (D) conductive metal oxide (wt. parts) | 1 | 1 | 3 | 3 | 3 |
| IZOD impact strength (1/8") (23° C., kgf · cm/cm) | 16 | 19 | 17 | 18 | 19 |
| Surface resistance ($\Omega$/sq.) | $10^8$ | $10^7$ | $10^5$ | $10^9$ | $10^{11}$ |

TABLE 2

| | Comparative Examples | | | |
|---|---|---|---|---|
| | 1 | 2 | 3 | 4 |
| (A) thermoplastic resin (wt. parts) | 97 | 97 | 100 | 100 |
| (B) carbon nanotubes (wt. parts) | 3 | 3 | — | — |
| (C) impact modifier (wt. parts) | — | — | — | 3 |
| (D) conductive metal oxide (wt. parts) | — | 1 | 3 | 3 |
| IZOD impact strength (1/8") (23° C., kgf · cm/cm) | 4 | N · A* | N · A* | 20 |
| Surface resistance ($\Omega$/sq.) | $10^{15}$ | $10^9$ | $10^{15}$ | $10^{15}$ |

N · A* (Not Available): IZOD impact strength cannot be measured due to excessively high brittleness of sample.

As can be seen from the data in Tables 1 and 2, Examples 1 to 5 comprising carbon nanotubes, an impact modifier and conductive metal oxide exhibit improved electrical conductivity, as compared to Comparative Examples 1, 3 and 4, which include only one or two of these components. In addition, Examples 1 to 5 exhibit improved impact resistance, as compared to Comparative Example 2, which does not include an impact modifier.

Accordingly, Examples 1 to 5 exhibit both high electrical conductivity and impact resistance, when compared to Comparative Examples 1 to 4.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. An electrically conductive thermoplastic resin composition comprising:
    about 80 to about 99.9 parts by weight of a thermoplastic resin;
    about 0.1 to about 10 parts by weight of carbon nanotubes;
    about 0.1 to about 10 parts by weight of an impact modifier, based on a total of about 100 parts by weight of the thermoplastic resin and the carbon nanotubes; and
    about 0.1 to about 10 parts by weight of conductive metal oxide, based on a total of about 100 parts by weight of the thermoplastic resin and the carbon nanotubes, wherein the conductive metal oxide includes zinc oxide combined with a metal comprising aluminum, gallium, germanium, indium, tin, or a combination thereof.

2. The electrically conductive thermoplastic resin composition according to claim 1, wherein the thermoplastic resin comprises polyacetal, acrylic resin, polycarbonate, styrenic resin, polyester, vinyl resin, polyphenylene ether, polyolefin, acrylonitrile-butadiene-styrene copolymer, polyarylate, polyamide, polyamide imide, polyarylsulfone, polyether imide, polyethersulfone, polyphenylene sulfide, polyvinylidene fluoride resin, polyimide, polyetherketone, polybenzoxazole, polyoxadiazole, polybenzothiazole, polybenzimidazole, polypyridine, polytriazole, polypyrrolidine, polydibenzofuran, polysulfone, polyurea, polyphosphazene, liquid crystal polymer resin, a copolymer thereof, or a combination thereof.

3. The electrically conductive thermoplastic resin composition according to claim 2, wherein the thermoplastic resin includes a polycarbonate resin.

4. The electrically conductive thermoplastic resin composition according to claim 3, wherein the polycarbonate resin includes an aromatic polycarbonate resin prepared by reacting phosgene, halogen formate or diester carbonate with a diphenol compound by represented by Formula 1 below:

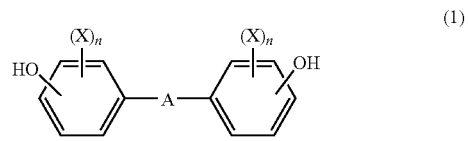

wherein A is a single bond, $C_1$-$C_5$ alkylene, $C_1$-$C_5$ alkylidene, $C_5$-$C_6$ cycloalkylidene, —S— or —$SO_2$—; X is halogen; and n is 0, 1 or 2.

5. The electrically conductive thermoplastic resin composition according to claim 2, wherein the thermoplastic resin includes a polycarbonate resin having a weight average molecular weight of about 15,000 to about 50,000 g/mol.

6. The electrically conductive thermoplastic resin composition according to claim 1, wherein the carbon nanotubes are single-walled carbon nanotubes, double-walled nanotubes, multi-walled carbon nanotubes, or a combination thereof.

7. The electrically conductive thermoplastic resin composition according to claim 1, wherein the carbon nanotubes have a diameter of about 1 to about 50 nm and a length of about 0.01 to about 10 μm.

8. The electrically conductive thermoplastic resin composition according to claim 1, wherein the carbon nanotubes have an aspect ratio of about 100 to about 1,000.

9. The electrically conductive thermoplastic resin composition according to claim 1, wherein the impact modifier comprises a core-shell graft copolymer, a silicone polymer, an olefin polymer, or a combination thereof.

10. The electrically conductive thermoplastic resin composition according to claim 9, wherein the core-shell graft copolymer has a core-shell structure comprising methyl methacrylate, styrene, acrylonitrile, or a combination thereof grafted on a rubber core polymerized from $C_4$-$C_6$ diene rubber monomer, acrylic rubber monomer, silicone rubber monomer, or a combination thereof.

11. The electrically conductive thermoplastic resin composition according to claim 9, wherein the silicone polymer includes a monomer comprising hexamethyl cyclotrisiloxane, octamethyl cyclotetrasiloxane, decamethyl cyclopentasiloxane, dodecamethyl cyclohexasiloxane, trimethyl triphenyl cyclotrisiloxane, tetramethyl tetraphenyl cyclotetrasiloxane, octaphenyl cyclotetrasiloxane, or a combination thereof.

12. The electrically conductive thermoplastic resin composition according to claim 9, wherein the olefin polymer includes a monomer comprising ethylene, propylene, isopropylene, butylene, isobutylene, or a combination thereof.

13. A plastic article prepared from the electrically conductive thermoplastic resin composition according to claim 1.

14. A plastic article comprising:
a thermoplastic resin matrix;
carbon nanotubes dispersed in the thermoplastic resin matrix;
an impact modifier dispersed in the thermoplastic resin matrix; and
conductive metal oxide dispersed in the thermoplastic resin matrix, wherein the conductive metal oxide includes zinc oxide combined with a metal comprising aluminum, gallium, germanium, indium, tin, or a combination thereof.

* * * * *